(12) United States Patent
Halal et al.

(10) Patent No.: US 9,074,333 B2
(45) Date of Patent: Jul. 7, 2015

(54) FLUID LEVEL CONTROL SYSTEM AND METHOD OF USING SAME

(75) Inventors: Afif Samih Halal, Katy, TX (US); Moye Wicks, III, Houston, TX (US)

(73) Assignee: Shell Oil Company, Houston, TX (US)

( * ) Notice: Subject to any disclaimer, the term of this patent is extended or adjusted under 35 U.S.C. 154(b) by 91 days.

(21) Appl. No.: 13/876,407

(22) PCT Filed: Sep. 27, 2011

(86) PCT No.: PCT/US2011/053410
§ 371 (c)(1),
(2), (4) Date: Mar. 27, 2013

(87) PCT Pub. No.: WO2012/050823
PCT Pub. Date: Apr. 19, 2012

(65) Prior Publication Data
US 2013/0183098 A1   Jul. 18, 2013

Related U.S. Application Data (60) Provisional application No. 61/387,833, filed on Sep. 29, 2010.

(51) Int. Cl.
| | | |
|---|---|---|
| E02B 15/04 | (2006.01) | |
| E02B 15/10 | (2006.01) | |
| E21B 43/01 | (2006.01) | |
| E21B 47/04 | (2012.01) | |
| G05D 9/12 | (2006.01) | |

(52) U.S. Cl.
CPC ............ *E02B 15/046* (2013.01); *E02B 15/045* (2013.01); *E02B 15/106* (2013.01); *E21B 43/0122* (2013.01); *E21B 47/042* (2013.01); *G05D 9/12* (2013.01); *E02B 15/04* (2013.01)

(58) Field of Classification Search
USPC ............................................. 405/60
See application file for complete search history.

(56) References Cited

U.S. PATENT DOCUMENTS

| | | |
|---|---|---|
| 3,643,741 A | 2/1972 | Miranda |
| 4,405,258 A | 9/1983 | O'Rourke et al. ............... 405/60 |
| 4,531,860 A | 7/1985 | Barnett ........................... 405/60 |
| 4,643,612 A | 2/1987 | Bergeron ........................ 405/60 |
| 4,653,960 A | 3/1987 | Chun ............................. 405/210 |
| 5,114,273 A | 5/1992 | Anderson ....................... 405/68 |
| 5,213,444 A | 5/1993 | Henning ......................... 405/63 |
| 6,592,299 B1 | 7/2003 | Becker .......................... 405/210 |
| 2002/0121369 A1* | 9/2002 | Allen .......................... 166/242.1 |
| 2005/0025574 A1* | 2/2005 | Lazes ............................ 405/60 |

(Continued)

FOREIGN PATENT DOCUMENTS

| | | |
|---|---|---|
| AU | 2011314143 | 4/2012 |
| CN | 2663289 | 12/2004 |
| CN | 2887956 | 4/2007 |

OTHER PUBLICATIONS

PCT Search Report, Application No. PCT/US2011/053410 dated Apr. 27, 2012.

*Primary Examiner* — Benjamin Fiorello
*Assistant Examiner* — Kyle Armstrong (57) ABSTRACT

A fluid level control system comprising a structure containing oil and water; a fluid off-take located on said structure; a flow controller fluidly connected to said fluid off-take; a sensor located on said structure and adapted to measure a property of said oil and said water; and a computer for interpreting a signal from said sensor.

13 Claims, 8 Drawing Sheets

(56) References Cited

U.S. PATENT DOCUMENTS

| | | | |
|---|---|---|---|
| 2011/0299929 A1* | 12/2011 | Sabourin | 405/60 |
| 2011/0311311 A1* | 12/2011 | Brey | 405/60 |
| 2011/0315393 A1* | 12/2011 | Wolinsky | 166/363 |
| 2011/0318106 A1* | 12/2011 | Gateff et al. | 405/60 |
| 2012/0027517 A1* | 2/2012 | Shifferaw | 405/60 |
| 2012/0087729 A1* | 4/2012 | Oesterberg et al. | 405/60 |
| 2012/0155964 A1* | 6/2012 | Carter et al. | 405/60 |
| 2012/0213588 A1* | 8/2012 | Shifferaw | 405/60 |
| 2013/0046126 A1* | 2/2013 | Varney et al. | 588/260 |
| 2013/0058722 A1* | 3/2013 | Kryzak | 405/60 |

* cited by examiner

FLUID LEVEL CONTROL SYSTEM AND METHOD OF USING SAME

PRIORITY CLAIM

The present application claims priority from PCT/US2011/053410, filed Sep. 27, 2011, which claims priority from U.S. provisional application 61/387,833, filed Sep. 29, 2010, which is incorporated herein by reference.

FIELD OF THE INVENTION

The invention is directed to control of a fluid level, particularly when the input and/or off-take rates are not constant.

BACKGROUND

U.S. Pat. No. 4,405,258 discloses a method for storing a lighter-than-water fluid, e.g., oil, produced from the blowout of an offshore subsea well. The method includes the steps of deploying a containment dome in shallow water near the location of the seabed where the containment dome is to be located. The containment dome has an upper expanded dome-like fluid impervious membrane, a fluid impervious hollow peripheral ring attached to the periphery of the membrane to provide a depending bag-like container, and discrete water drainage means within the bag-like container for connection to pump conduit means therefrom. Wet sand from the seabed is then pumped into the bag-like container, and water is then drained from the wet sand through the water drainage means so as to provide a body of drained sand disposed within the bag-like container and providing a hollow peripheral ring as a hollow peripheral torus acting as a self-supporting structure and as an anchor for the dome-like structural unit. The dome is then charged with a buoyant amount of air and the buoyed dome is floated out to the site where the dome is to be deployed. It is then submerged by controllably releasing the air while substantially simultaneously filling the dome with water, thereby sinking the dome until the lighter-than-water fluid is captured within the dome, while such fluid substantially simultaneously displaces water from within the dome. U.S. Pat. No. 4,405,258 is herein incorporated by reference in its entirety.

U.S. Pat. No. 4,643,612 discloses an oil storage barge having a concave bottom is adapted to be anchored over a subsea well or pipeline that is leaking oil. Flexible skirts extend to the ocean floor, and oil that is trapped under the barge may be stored in the barge or then transferred to another vessel. U.S. Pat. No. 4,643,612 is herein incorporated by reference in its entirety.

U.S. Pat. No. 5,114,273 discloses a protective device installed to or around an offshore drilling platform for oil or gas and the device when in operation to encircle or enclose the platform with a floating containment device and attached oil containment curtain hanging from the device to the ocean floor. The pollution containment device is submerged normally and activated to the surface when needed. This device will entrap offshore platform pollutants in a short amount of time with a minimum amount of effort and will maintain a clean environment. Other methods of offshore platform pollution containment devices are shown, including permanent non-moving oil pollution containment barriers and activated barriers that operate internally and externally of the oil platform to form an all encompassing barrier from the ocean floor to above the water surface to hold an oil spill to the platform area. U.S. Pat. No. 5,114,273 is herein incorporated by reference in its entirety.

U.S. Pat. No. 5,213,444 discloses an oil/gas collector/separator for recovery of oil leaking, for example, from an offshore or underwater oil well. The separator is floated over the point of the leak and tethered in place so as to receive oil/gas floating, or forced under pressure, toward the water surface from either a broken or leaking oil well casing, line, or sunken ship. The separator is provided with a downwardly extending skirt to contain the oil/gas which floats or is forced upward into a dome wherein the gas is separated from the oil/water, with the gas being flared (burned) at the top of the dome, and the oil is separated from water and pumped to a point of use. Since the density of oil is less than that of water it can be easily separated from any water entering the dome. U.S. Pat. No. 5,213,444 is herein incorporated by reference in its entirety.

U.S. Pat. No. 6,592,299 discloses a method of detecting and locating fresh water springs at sea essentially by taking salinity measurements and by methods and installations for collecting the fresh water. The collection installations comprise an immersed bell-shaped reservoir containing and trapping the fresh water in its top portion, and a pumping system for taking fresh water and delivering the fresh water via a delivery pipe, characterized in that the circumference of the bottom end of the reservoir and/or the circumference of the bottom end of a chimney inside the reservoir and open at its top end and surrounding the fresh water resurgence in part and preferably in full, follow(s) closely the outline of the relief of the bottom of the sea so as to provide leakproofing between the circumference(s) and the bottom of the sea. U.S. Pat. No. 6,592,299 is herein incorporated by reference in its entirety.

There is a need in the art for one or more of the following:

Improved systems and methods for controlling a fluid level in a vessel;

Improved systems and methods for collecting spilled oil and gas from a marine environment;

Improved systems and methods for collecting oil and gas spilling from a subsea well;

Improved systems and methods for collecting oil and gas spilling from a subsurface formation located beneath a body of water; and/or Improved systems and methods for collecting oil and gas spilling from a subsurface formation located beneath a body of water, and then preventing the oil and gas from mixing with the water.

SUMMARY OF THE INVENTION

One aspect of the invention provides a fluid level control system comprising a structure containing oil and water; a fluid off-take located on said structure; a flow controller fluidly connected to said fluid off-take; a sensor located on said structure and adapted to measure a property of said oil and said water; and a computer for interpreting a signal from said sensor.

Another aspect of the invention provides a method comprising flowing at least oil and water into a structure; measuring at least one property of said oil and water; interpreting said measurement to determine a level of an oil-water interface in said structure; and using said measurement to adjust a flow rate of said oil out of said structure.

Another aspect of the invention provides a fluid level control system, comprising a structure containing oil and water; a means for measuring a property of said oil and water; a means for determining a location of an oil-water interface in said structure; a means for removing at least a portion of said oil; and a means for controlling a flow rate of said removed oil.

BRIEF DESCRIPTION OF THE DRAWINGS

So that the features and advantages of the present invention can be understood in detail, a more particular description of the invention may be had by reference to the embodiments thereof that are illustrated in the appended drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

DETAILED DESCRIPTION

Presently preferred embodiments of the invention are shown in the above-identified figures and described in detail below. Embodiments are described with reference to certain features and techniques for containing fluids released into the sea.

Figure 1:
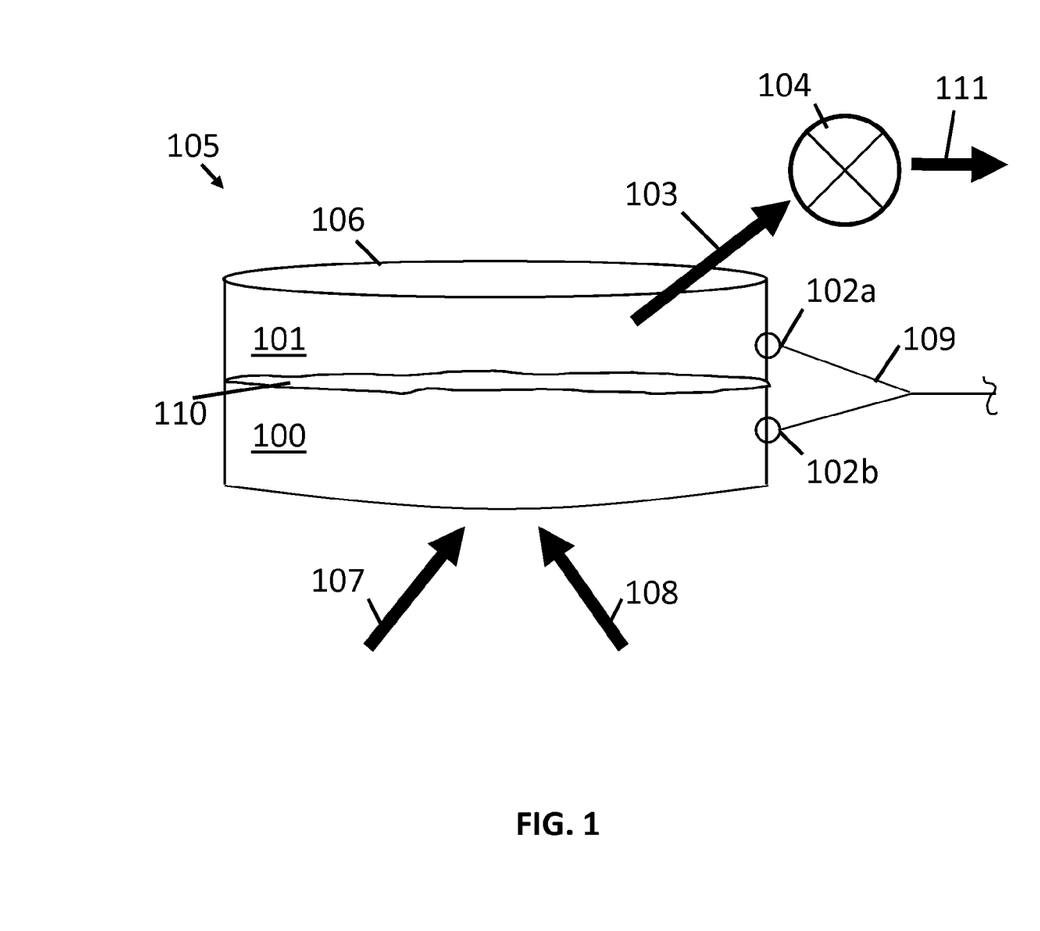
FIG. 1 is a diagram depicting a fluid level control system, the fluid level control system having sensors, a fluid off-take, and a means of flow control in accordance with an aspect of the present invention.

FIG. 1:

FIG. 1 is a diagram depicting fluid level control system 105. Water 100 and oil 101 are located within structure 106. Inflow stream of oil 107 and inflow stream of water 108 may enter structure 106. Structure 106 may be, for example, a temporary or permanent storage system, a vessel, another containment apparatus, or a separator that separates components of fluid, such as gas and liquid, or different kinds of liquids, etc.

Some portions of oil 101 may optionally be removed from structure 106 by fluid off-take 103. If oil 101 exits structure 106 through fluid off-take 103 too quickly, excess water 100 is drawn in to fluid off-take 103 with oil 101. The rate of oil 101 exiting structure 106 by fluid off-take 103 is controlled by means of flow control 104. Means of flow control 104 may be through opening or closing a choke or other flow restriction, turning on or off a pump, increasing or decreasing the rate of artificial lift, or any other method capable of being adjusted to restrict or promote fluid flow as are known in the art. Fluid exits means of flow control 104 with a modified flow rate and in the direction of arrow 111.

Structure 106 contains any number of sensors 102 arranged circumferentially about and/or axially along structure 106. Sensors 102 may be any conventional sensor capable of differentiating between properties of oil 101 and properties of water 100.

Sensors 102 may be, for example, resistance temperature detectors (RTD), thermocouples, thermistors, etc. Temperature is easily measured accurately using a class of sensors referred to as RTDs. Metal contained in the RTD changes resistance in response to temperature changes in a predictable pattern. Various RTD configurations are available, from two-wire to four-wire RTDs. As the number of wires increases, the accuracy of the RTD increases. RTDs are widely used in applications from −270° C. up to 660° C. Suitable RTDs are commercially available from a wide range of suppliers, such as Omega Engineering, Advanced Sensing Products, HL-Planar Technik, Pyro Electric Inc, etc.

There are many additional properties that could be measured by sensor 102 to distinguish oil 101 from water 100. The properties may be sufficiently different such that oil 101 is capable of being identified separately from water 100, and sensor 102 may operate in the given environment. Other properties that may be measured with sensors 102 include, for example, electrical conductivity, resistivity, viscosity, dielectric constant, hydrocarbon content, chemical composition, and others as are known in the art.

In one embodiment, structure 106 contains at least upper set of sensors 102a and lower set of sensors 102b. Measuring temperature at various heights in structure 106 provides information on the level of the oil 101 and water 100 interface 110. It may be desired to position upper set of sensors 102a and lower set of sensors 102b such that the oil 101 and water 100 interface 110 is between the upper set of sensors 102a and lower set of sensors 102b. However, it will be appreciated by one of skill in the art that one or more sets of sensors 102 may be desirable.

Signal lines 109 are attached to sensors 102 and transmit the appropriate signals thereto. Signal lines 109 may be metallic (such as copper for use with an RTD), fiber optic, or any other material sufficient to transmit the required signal. Signal lines 109 may be located along structure 106, integrated into structure 106, run internally to structure 106, or attached in any other way known in the art.

Although oil 101 and water 100 have been discussed, in other embodiments, other materials such as liquid 100 and gas 101 could be used with structure 106 where sensor 102 could be used to differentiate between liquid 100 and gas 101.

Figure 2:
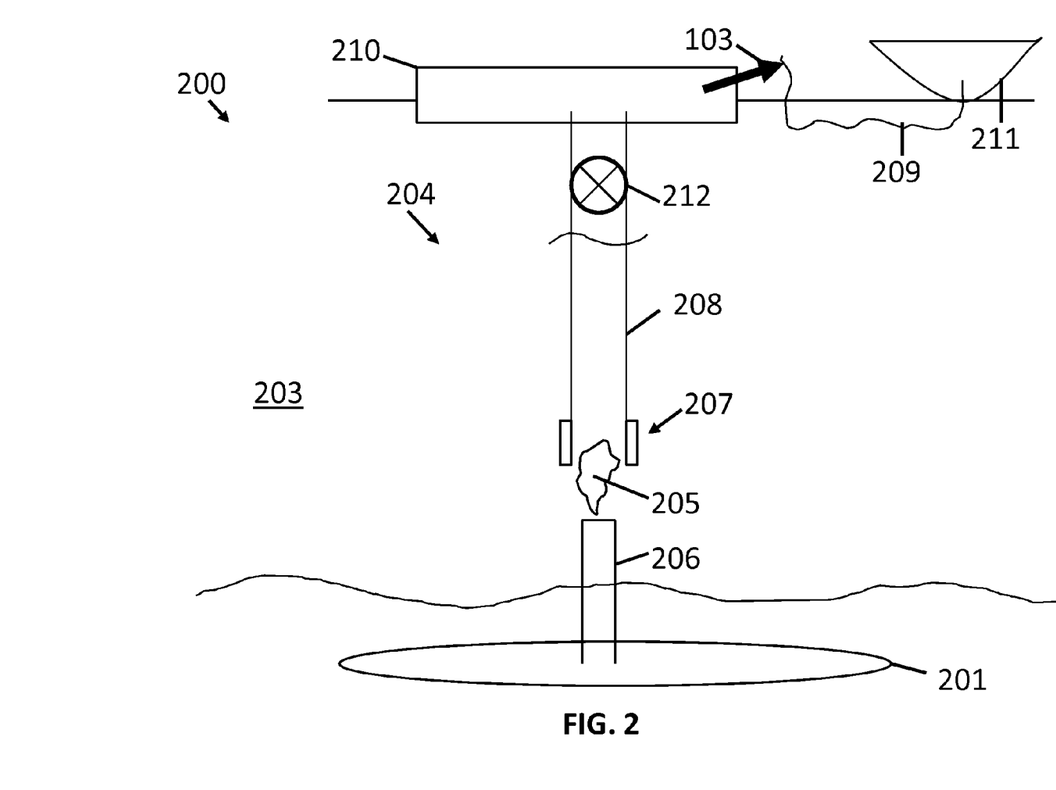
FIG. 2 is a diagram depicting a wellsite positioned above a subsea reservoir, the wellsite having a fluid level control system in accordance with an aspect of the present invention.

FIG. 2:

FIG. 2 is a diagram depicting wellsite 200 positioned above subsea reservoir 201.

From time to time, leak 205 may escape from subsea reservoir 201 and into sea 203 as fluid is produced from subsea reservoir 201. Leak 205 may be oil, gas, or other hydrocarbons. Wellsite 200 is provided with containment system 204 for capturing leak 205 emerging from discharge source 206 and entering into sea 203. In one embodiment, containment system 204 and each of its components may be configured for operability in harsh conditions and/or are transportable as needed.

Discharge source 206 is connected to subsea reservoir 201 and may be, for example, a leaking pipe, a well, or a fracture leading to seepage. Containment system 204 includes capture portion 207, riser portion 208 extending upwards for receiving leak 205 generated from discharge source 206, and means for controlling flow 212 of leak 205 in riser portion 208. Riser portion 208 is connected to capture portion 207 and extends to surface collector 210 floating on sea 203. Riser portion 208 preferably shifts with movement of sea 203 that may result from, for example, currents, waves, storms, etc.

Suitable riser portions 208 are disclosed in co-pending U.S. Provisional Application 61/376,595, filed Aug. 24, 2010, and having attorney docket number TH4088. U.S. Provisional Application 61/376,595 is herein incorporated by reference in its entirety. Fluid drawn from subsea reservoir 201 to the surface via riser portion 208 may be stored in surface collector 210. Surface collector 210 may be, for example, a temporary or permanent storage system, a vessel, another containment apparatus, or a separator that separates components of fluid, such as gas and liquid, etc.

Suitable surface collectors 210 are disclosed in co-pending U.S. Provisional Application 61/376,542, filed Aug. 24, 2010, and having attorney docket number TH4085; co-pending U.S. Provisional Application 61/376,534, filed Aug. 24, 2010, and having attorney docket number TH4086; and co-pending U.S. Provisional Application 61/376,581, filed Aug. 24, 2010, and having attorney docket number TH4087. U.S. Provisional Applications 61/376,542; 61/376,534; and 61/376,581 are herein incorporated by reference in their entirety.

In one embodiment, surface collector 210 may have a sealed bottom with an inlet connected to riser portion 208. In another embodiment, surface collector 210 may have an open bottom with an inlet to sea 203 which allows gases and/or fluids to enter surface collector 210.

Some portions of the fluid stored in surface collector 210 may optionally be removed, for example, by fluid off-take 103. Fluid off-take 103 may optionally be connected to vessel 211 via tubing (or hoses, or floating line, or off-take line) 209 for transport. Tubing 209 fluidly connects surface collector 210 to vessel 211 for establishing fluid communication therebetween.

Means for controlling flow 212 may be positioned anywhere in containment system 204 and is used to encourage or discourage flow in riser portion 208. If fluids are flowing through riser portion 208 too quickly, excess water from sea 203 is drawn in with leak 205. If fluids are flowing through riser portion 208 too slowly, leak 205 will escape into sea 203. Means for controlling flow 212 may be through opening or closing a choke or other flow restriction, turning on or off a pump, increasing or decreasing the rate of artificial lift, or any other method capable of being adjusted to restrict or promote fluid flow as are known in the art.

If wellsite 200 already has a functioning choke, valve, or other means of controlling flow from discharge source 206, this pre-existing device may be used as the means for controlling flow 212.

Figure 3A:
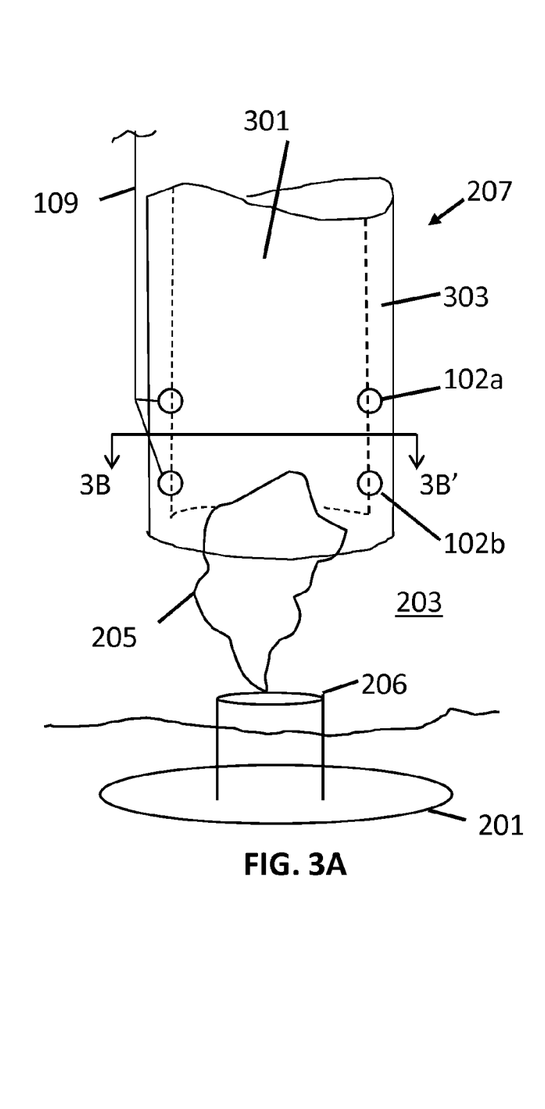
FIGS. 3A-3B are diagrams depicting a capture portion usable with the fluid level control system of FIG. 1 and 2.
Figure 3B:
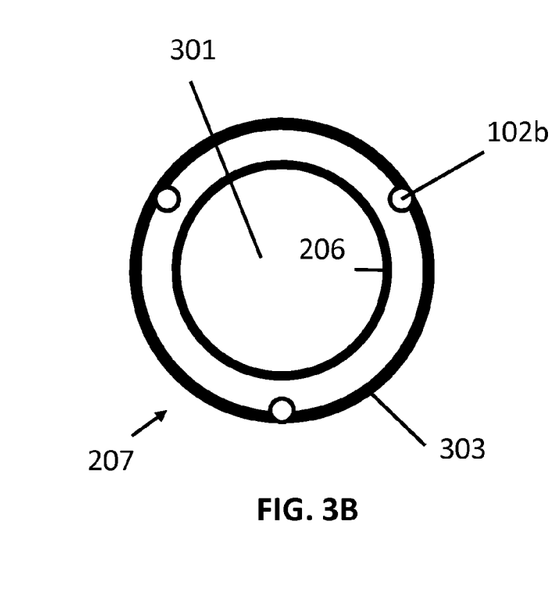

FIG. 3A-3B:

FIG. 3A is a drawing of capture portion 207. FIG. 3B is a cross-sectional view through the line 3B-3B'. Capture portion 207 defines an internal space 301. Leak 205 exits discharge source 206 into sea 203. Capture portion 207 is situated above discharge source 206 and contains internal space 301 to contain leak 205. Leak 205 travels through internal space 301 and passes into riser portion 208. Referring again to FIG. 1, once inside riser portion 208, leak 205 naturally flows towards surface, for example due to buoyancy of the oil and/or gas in water, due to the pressure of leak 205, due to a pump, or due to other artificial lift. Leak 205 passes through means for controlling flow 212 and is safely transported to surface collector 210 without further contacting sea 203.

As seen in FIGS. 3A and 3B, capture portion 207 contains a number of sensors 102 arranged circumferentially about and/or axially along body 303 of capture portion 207. In some embodiments there are from 1 to 10 sensors, for example from about 2 to 5 sensors arranged circumferentially about body 303, such as three sensors 102 arranged at three locations 120 degrees apart. However, it will be appreciated by one of skill in the art that multiple sensors 102 arranged along and/or about body 303 may be desired, and there may be applications where a single sensor 102 may be sufficient. The sensor may be capable of differentiating between properties of leak 205 and properties of sea 203. Features of sensors 102 are more fully explained above with reference to FIG. 1.

There are many additional properties that could be measured by sensor 102 to distinguish leak 205 from sea 203. The properties may be sufficiently different such that leak 205 is capable of being identified separately from water from sea 203, and sensor 102 may operate in the given environment. Other properties that may be measured with sensors 102 include, for example, temperature, pressure, density, electrical conductivity, resistivity, viscosity, dielectric constant, hydrocarbon content, chemical composition, and others as are known in the art.

In one embodiment, body 303 contains at least upper set of sensors 102a and lower set of sensors 102b. Measuring temperature at various heights in capture portion 207 provides information on the level of leak 205. It may be desired to position upper set of sensors 102a and lower set of sensors 102b such that the leak 205 and sea 203 interface is between upper set of sensors 102a and lower set of sensors 102b. However, it will be appreciated by one of skill in the art that one or more sets of sensors 102 may be desirable.

Signal lines 109 are attached to sensors 102 and transmit the appropriate signals thereto. Signal lines 109 may be metallic (such as copper for use with an RTD), fiber optic, or any other material sufficient to transmit the required signal. Signal lines 109 may be located along body 303 of capture portion 207 or attached in any other way known in the art. External lines, for example, may be secured by clamps or ties strapped along the outside of riser portion 208. Additionally, signal lines 109 may be integrated into body 303 of capture portion 207 and/or riser portion 208, or they may be run internally to body 303. Insulation may be included on body 303 of capture portion 207 to protect against adverse conditions.

Figure 3C:
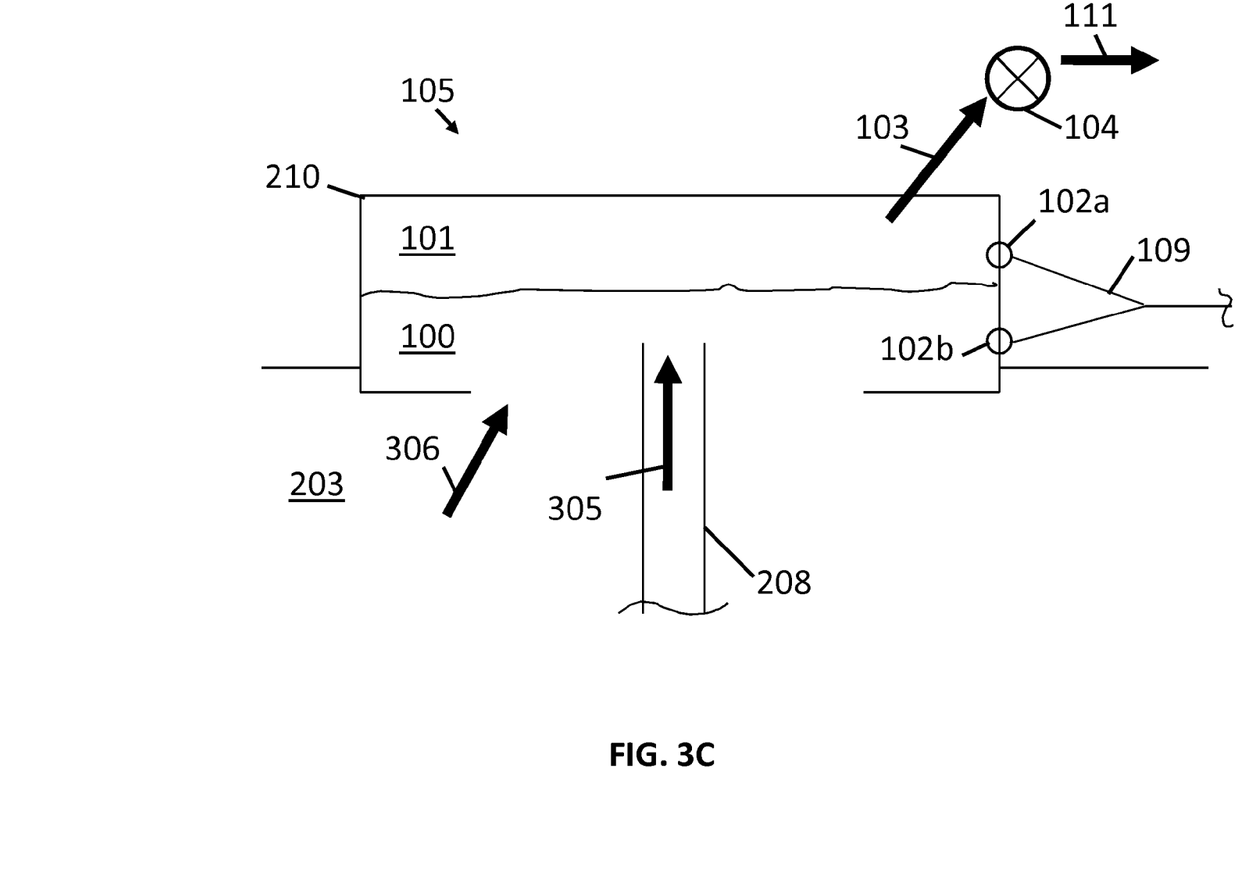
FIG. 3C is a diagram depicting a surface collector usable with the fluid level control system of FIGS. 1 and 2.

FIG. 3C:

FIG. 3C depicts another embodiment of fluid level control system 105 described in FIG. 1. Water 100 and oil 101 are located within surface collector 210. Surface collector 210 has a bottom open to sea 203. Surface collector 210 may be, for example, a temporary or permanent storage system, a vessel, another containment apparatus, or a separator that separates components of fluid, such as gas and liquid, etc. Suitable surface collectors 210 are disclosed in co-pending U.S. Provisional Application 61/376,542, filed Aug. 24, 2010, and having attorney docket number TH4085; and co-pending U.S. Provisional Application 61/376,534, filed Aug. 24, 2010, and having attorney docket number TH4086. U.S. Provisional Applications 61/376,542 and 61/376,534 are herein incorporated by reference in their entirety.

Some portions of oil 101 may optionally be removed from surface collector 210 by fluid off-take 103. Fluid inflow rate 305 exits riser portion 208 and enters surface collector 210. If the rate of oil 101 exiting surface collector 210 through fluid off-take 103 is greater than fluid inflow rate 305, excess water from sea 203 may be drawn in to surface collector 210, as shown by arrow 306. The rate of oil 101 exiting surface collector 210 by fluid off-take 103 is controlled by means of flow control 104. Means of flow control 104 is more fully explained in reference to FIG. 1.

Surface collector 210 contains any number of sensors 102 arranged circumferentially about and/or axially along surface collector 210. Sensors 102 are more fully explained in reference to FIG. 1.

In one embodiment, surface collector 210 contains at least upper set of sensors 102a and lower set of sensors 102b. Sensor 102 arrangement is more fully explained in reference to FIG. 1 and FIGS. 3A-3B.

Signal lines 109 are attached to sensors 102 and transmit the appropriate signals thereto. Signal lines 109 are more fully explained in reference to FIG. 1 and FIGS. 3A-3B.

The operation is more fully explained below with reference to FIGS. 4A-4B and FIGS. 5A-5B.

Figure 4A:
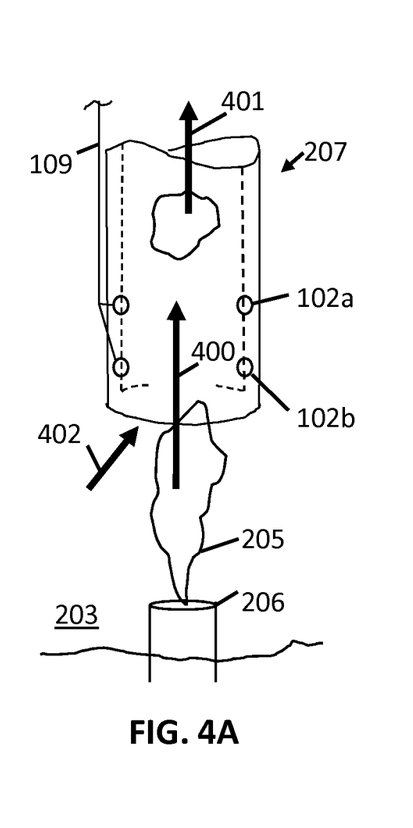
FIGS. 4A-4B are diagrams depicting use of the fluid level control system to prevent excess fluid from entering the capture portion of FIGS. 3A-3B.
Figure 4B:
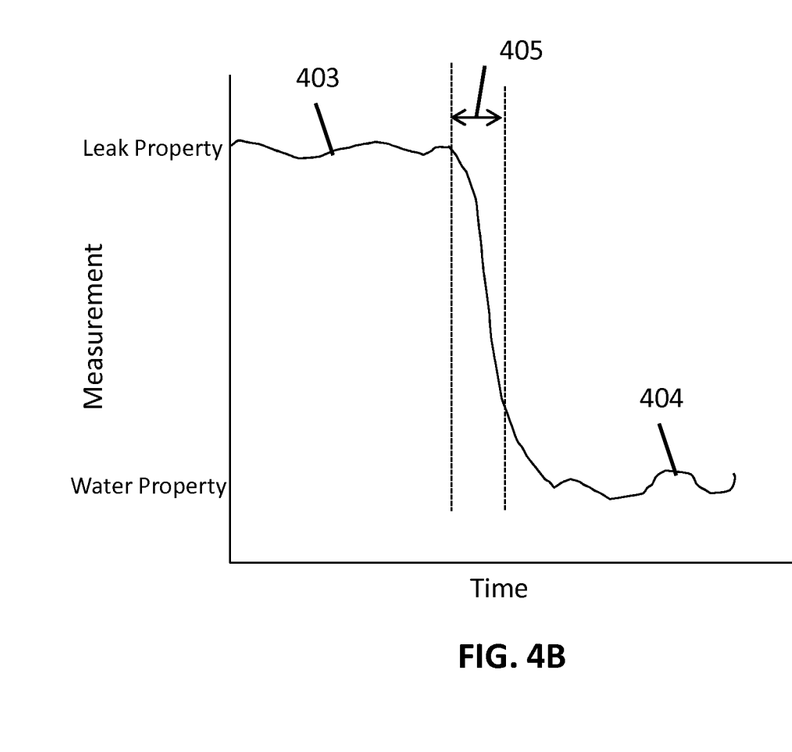

FIG. 4A-4B:

FIG. 4A is a drawing of leak 205 passing through capture portion 207. FIG. 4B depicts a measured property versus time graph that may be used to determine whether to open or close means for controlling flow 212 (shown in FIG. 2).

Signals are transmitted from sensors 102 via signal lines 109. Signals are read via a conventional scanner and are converted into temperatures (or one of the other measured properties) by a computer program.

Referring to FIG. 4A, when inflow rate 400 of leak 205 into capture portion 207 is less than off-take rate 401 of fluids in capture portion 207, extra water from the sea 203 will enter capture portion 207, as shown by arrow 402.

Referring to FIG. 4B, when leak 205 is near sensor 102, sensor 102 will read leak property 403. When water from sea 203 is near sensor 102, sensor 102 will read water property 404. The portion of the graph between leak property 403 and water property 404 is transition zone 405.

In one embodiment, upper set of sensors 102a and lower set of sensors 102b are used. If off-take rate 401 is greater than inflow rate 400, water from sea 203 will enter capture portion 207. If both upper set of sensors 102a and lower set of sensors 102a read water property 404, water from sea 203 is entering through the base of capture portion 207 and being carried up riser portion 208. Means for controlling flow 212 can be adjusted to reduce off-take rate 401. This will reduce the difference between off-take rate 401 and inflow rate 400 and will minimize water from sea 203 entering capture portion 207.

As off-take rate 401 is reduced, readings from upper set of sensors 102a will move through transition zone 405 towards leak property 403. When upper set of sensors 102a reads leak property 403 while lower set of sensors 102b reads water property 404, the leak 205—water from the sea 203 interface is between upper set of sensors 102a and lower set of sensors 102b.

Figure 5A:
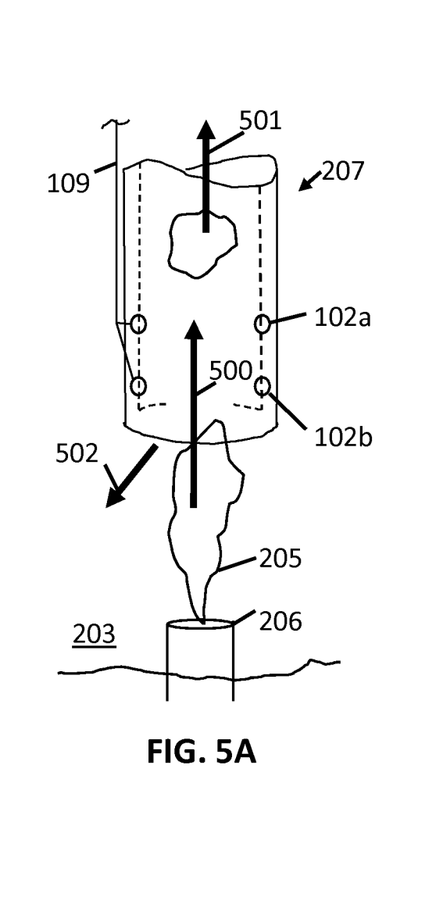
FIGS. 5A-5B is a diagram depicting use of the fluid level control system to prevent fluid from exiting the capture portion of FIGS. 3A-3B.
Figure 5B:
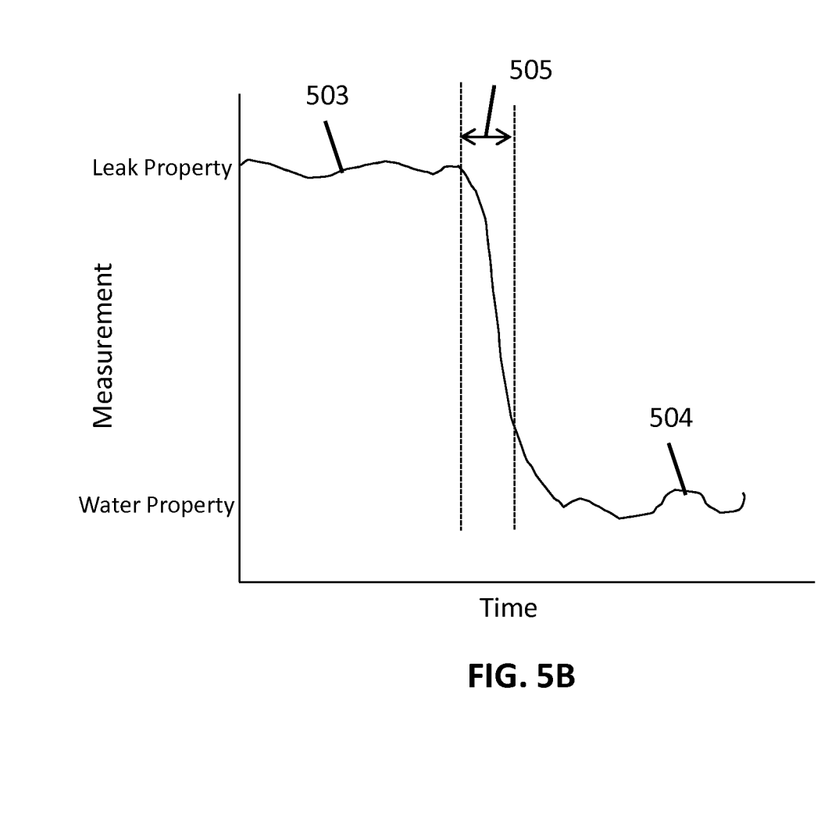

FIG. 5A-5B:

FIG. 5A is a drawing of leak 205 passing through capture portion 207. FIG. 5B depicts a measured property versus time graph that may be used to determine whether to open or close means for controlling flow 212.

Signals are transmitted from sensors 102 via signal lines 109. Signals are read via a conventional scanner and are converted into temperatures (or one of the other measured properties) by a computer program.

Referring to FIG. 5A, when inflow rate 500 of leak 205 into capture portion 207 is greater than off-take rate 501 of fluids in capture portion 207, leak 205 will exit capture portion 207 and enter sea 203, as shown by arrow 502.

Referring to FIG. 5B, when leak 205 is near sensor 102, sensor 102 will read leak property 503. When water from sea 203 is near sensor 102, sensor 102 will read water property 504. The portion of the graph between leak property 503 and water property 504 is transition zone 505.

In one embodiment, upper set of sensors 102a and lower set of sensors 102b are used. If off-take rate 501 is less than inflow rate 500, leak 205 will exit capture portion 207. If both upper set of sensors 102a and lower set of sensors 102a read leak property 503, leak 205 is exiting capture portion 207 and entering sea 203. Means for controlling flow 212 can be adjusted to increase off-take rate 501. This will reduce the difference between off-take rate 501 and inflow rate 500 and will minimize leak 205 exiting capture portion 207.

As off-take rate 501 is increased, readings from lower set of sensors 102a will move through transition zone 505 towards water property 504. When upper set of sensors 102a reads leak property 503 while lower set of sensors 102b reads water property 504, the leak 205—water from the sea 203 interface is between upper set of sensors 102a and lower set of sensors 102b.

Referring to FIGS. 4A-4B and 5A-5B, in this way, means for controlling flow 212 can be adjusted to optimize off-take rate 401 and 501, and consequently amount of flow through riser portion 208. This minimizes water from the sea 203 entering capture portion 207 and leak 205 from escaping capture portion 207.

Statistical techniques may be used to interpret the measurements to determine in the minimum number of observations whether the given property has departed significantly from either the property of the first fluid or the property of the second fluid. Any plots that clearly distinguish the properties of the first fluid from the properties of the second fluid, similar to FIG. 4B and FIG. 5B, may be used.

Figure 6:
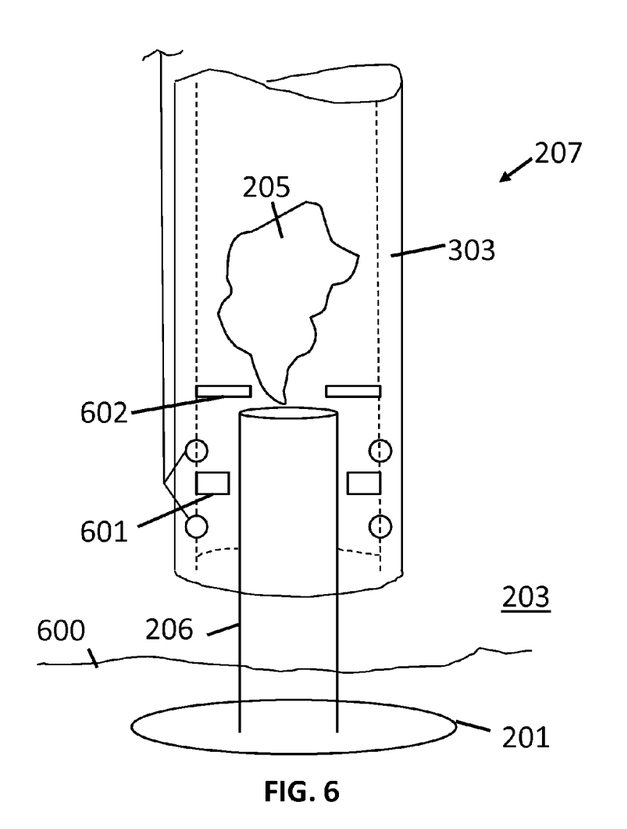
FIG. 6 is a diagram depicting use of the capture portion and fluid level control system of FIGS. 1-3 to contain a subsea leak.

FIG. 6:

FIG. 6 depicts another embodiment of the invention. Discharge source 206 extends through sea floor 600 to contact subsea reservoir 201. As leak 205 rises above discharge source 206, leak 205 disperses and mixes with sea 203. In turn, it becomes harder to distinguish leak 205 from sea 203. The closer capture portion 207 is to leak 205, the smaller capture portion 207 required and the more distinct leak 205 properties are from sea 203 properties. The optimum capture portion 207 would encompass the outer surface of discharge source 206. Centralizers 601 may be included to ensure discharge source 206 is centered within capture portion 207. For example, centralizers 601 may be a spring-type centralizer to ease installation of capture portion 207 and account for discharge sources 206 that are irregularly shaped. Mechanical stops 602 may be included on body 303 of capture portion 207 to provide a way for capture portion 207 to rest on the end of discharge source 206. This will ensure capture portion 207 fully surrounds leak 205.

The operation and remaining features are more fully explained above with reference to FIGS. 1-5.

Figure 7:
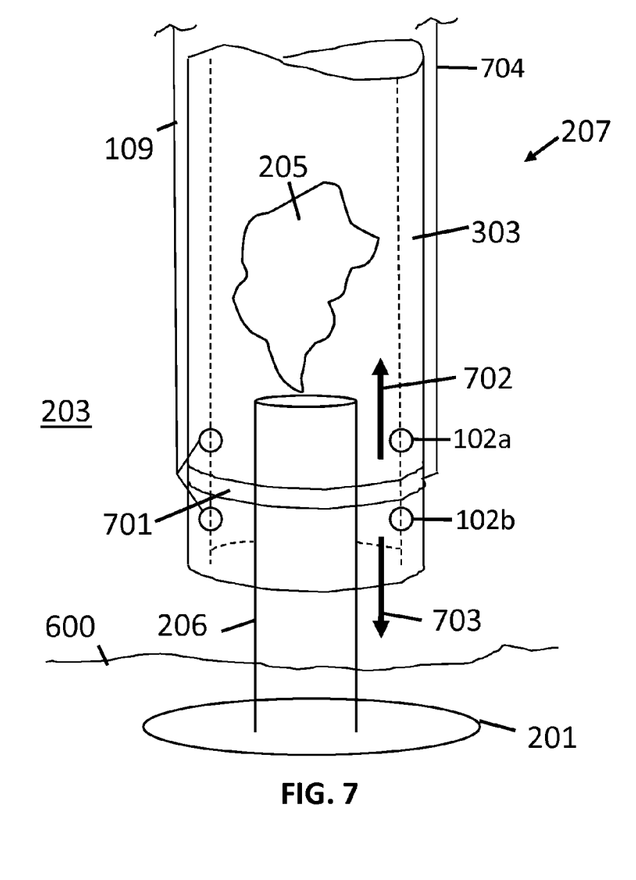
FIG. 7 is a diagram depicting use of a heater strip with the capture portion and fluid level control system of FIGS. 1-3 to indicate direction of fluid movement.

FIG. 7:

FIG. 7 depicts another embodiment of the present invention. Discharge source 206 extends through sea floor 600 to contact subsea reservoir 201. Leak 205 rises above discharge source 206. Capture portion 207 may encompass the outer surface of discharge source 206. Heater strip 701 is located between upper set of sensors 102a and lower set of sensors 102b on body 303 of capture portion 207. Heater strip wires 704 are attached to heater strip 701 to provide appropriate signals thereto.

Heater strip wires 704 may be metallic, fiber optic, or any other material sufficient to transmit the required signal. Heater strip wires 704 may be located along body 303 of capture portion 207 or attached in any other way known in the art. External lines, for example, may be secured by clamps or ties strapped along the outside of riser portion 208. Additionally, heater strip wires 704 may be integrated into body 303 of capture portion 207 and/or riser portion 208, or they may be run internally. Heater strip wires 704 may be combined with signal lines 109. Signal lines 109 are more fully explained in reference to FIG. 1 and FIGS. 3A-3B. Insulation may be included on body 303 of capture portion 207 to protect against adverse conditions.

Upper set of sensors 102a and lower set of sensors 102b may be, for example, resistance temperature detectors (RTD), thermocouples, thermistors, etc. Sensors 102 and arrangement is more fully explained in reference to FIG. 1 and FIGS. 3A-3B.

Appropriate signals are transmitted via heater strip wires 704 to heater strip 701. Heater strip 701 introduces energy into gas and/or fluid passing near heater strip 701. If fluid is moving in the direction shown by arrow 702, the temperature measured at lower set of sensors 102b will be lower than the temperature measured at upper set of sensors 102a. If fluid is moving in the direction shown by arrow 703, the temperature measured at upper set of sensors 102a will be lower than the temperature measured at lower set of sensors 102b. The temperature of upper set of sensors 102a and lower set of sensors 102b may be used with heater strip 701 to determine the direction in which fluid is moving.

Illustrative Embodiments:

In one embodiment, there is disclosed a fluid level control system comprising a structure containing oil and water; a fluid off-take located on said structure; a flow controller fluidly connected to said fluid off-take; a sensor located on said structure and adapted to measure a property of said oil and said water; and a computer for interpreting a signal from said sensor. In some embodiments, the system also includes signal wires connecting said sensor to said computer. In some embodiments, the system also includes a control source to transmit said interpreted signal to said flow controller. In some embodiments, the system also includes an oil input and a water input. In some embodiments, said structure further comprises an internal centralizer. In some embodiments, said structure further comprises an internal mechanical stop. In some embodiments, said structure further comprises a heater strip. In some embodiments, the system also includes a plurality of sensors arranged circumferentially along said structure. In some embodiments, the system also includes a plurality of sensors arranged axially along said structure. In some embodiments, said flow controller is selected from the group consisting of a choke, a valve, a flow restriction, and a pump. In some embodiments, said structure further comprises a capture device located over a source of hydrocarbons near a bottom of a body of water. In some embodiments, said structure further comprises a surface collector located near a top surface of a body of water. In some embodiments, said surface collector further comprises a sealed bottom. In some embodiments, said surface collector further comprises an open bottom. In some embodiments, the system also includes a vessel fluidly connected to said surface collector by a hose, wherein said vessel is adapted to store and/or transport at least a portion of liquids in said surface collector.

In one embodiment, there is disclosed a method comprising flowing at least oil and water into a structure; measuring at least one property of said oil and water; interpreting said measurement to determine a level of an oil-water interface in said structure; and using said measurement to adjust a flow rate of said oil out of said structure. In some embodiments, the method also includes positioning said structure over a source of hydrocarbons.

In one embodiment, there is disclosed a fluid level control system, comprising a structure containing oil and water; a means for measuring a property of said oil and water; a means for determining a location of an oil-water interface in said structure; a means for removing at least a portion of said oil; and a means for controlling a flow rate of said removed oil. In some embodiments, the system also includes a means for collecting additional oil into said structure. In some embodiments, said structure further comprises an open bottom located over an oil leak source.

It will be understood from the foregoing description that various modifications and changes may be made in the preferred and alternative embodiments of the present invention without departing from its true spirit.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A fluid level control system comprising:
   a structure comprising a heating strip and a plurality of sensors arranged circumferentially along said structure, wherein said plurality of sensors comprises at least an upper set of sensors above the heating strip and a lower set of sensors below the heating strip;
   a fluid off-take located on said structure; a flow controller fluidly connected to said fluid off-take;
   a sensor located on said structure and adapted to measure a property of said oil and said water;
   a computer for interpreting a signal from said plurality of sensors; and
   a capture device located over a source of hydrocarbons near a bottom of a body of water.

2. The system of claim 1, further comprising signal wires connecting said plurality of sensors to said computer.

3. The system of claim 1, further comprising a control source to transmit said interpreted signal to said flow controller.

4. The system of claim 1, further comprising an oil input and a water input.

5. The system of claim 1, wherein said structure further comprises an internal centralizer.

6. The system of claim 1, wherein said structure further comprises an internal mechanical stop.

7. The system of claim 1, wherein said flow controller is selected from the group consisting of a choke, a valve, a flow restriction, and a pump.

8. The system of claim 1, wherein said structure further comprises a surface collector located near a top surface of a body of water.

9. The system of claim 8, wherein said surface collector further comprises a sealed bottom.

10. The system of claim 8, wherein said surface collector further comprises an open bottom.

11. The system of claim 8, further comprising a vessel fluidly connected to said surface collector by a hose, wherein said vessel is adapted to store and/or transport at least a portion of liquids in said surface collector.

12. A method comprising:
    flowing at least oil and water into a structure, wherein said structure comprises a a heating strip and a plurality of sensors arranged circumferentially along said structure, wherein said plurality of sensors comprises at least an upper set of sensors above said heating strip and a lower set of sensors below said heating strip;

measuring at least one property of said oil and water;

interpreting said measurement to determine a level of an oil-water interface in said structure;

using said measurement to adjust a flow rate of said oil out of said structure such that the level of the oil-water interface in said structure is below the upper set of sensors and above the lower set of sensors; and positioning said structure over a source of hydrocarbons near a bottom of a body of water.

13. A fluid level control system, comprising:

a structure containing oil and water, wherein said structure comprises a heating strip and a plurality of sensors arranged circumferentially along said structure, wherein said plurality of sensors comprises at least an upper set of sensors above said heating strip and an oil water interface and a lower set of sensors below said heating strip and the oil water interface;

a means for removing at least a portion of said oil;

a means for controlling a flow rate of said removed oil; and said structure further comprises an open bottom located over an oil leak source in a body of water.

* * * * *